(12) United States Patent
Eronen et al.

(10) Patent No.: US 9,378,207 B2
(45) Date of Patent: Jun. 28, 2016

(54) METHODS AND APPARATUS FOR MULTIMEDIA CREATION

(75) Inventors: Antti Eronen, Tampere (FI); Juha H. Arrasvuori, Tampere (FI); Arto J. Lehtiniemi, Lempaala (FI)

(73) Assignee: Nokia Technologies Oy, Espoo (FI)

(*) Notice: Subject to any disclaimer, the term of this patent is extended or adjusted under 35 U.S.C. 154(b) by 344 days.

(21) Appl. No.: 13/537,287

(22) Filed: Jun. 29, 2012

(65) Prior Publication Data
US 2014/0006397 A1 Jan. 2, 2014

(51) Int. Cl.
*G06F 17/30* (2006.01)

(52) U.S. Cl.
CPC .................. *G06F 17/30017* (2013.01)

(58) Field of Classification Search
None
See application file for complete search history.

(56) References Cited

U.S. PATENT DOCUMENTS

| | | | |
|---|---|---|---|
| 6,931,399 B2* | 8/2005 | Cheng et al. | 707/769 |
| 7,031,952 B1* | 4/2006 | Heumann et al. | |
| 7,460,731 B2 | 12/2008 | Senftner et al. | 382/284 |
| 7,519,562 B1* | 4/2009 | Vander Mey et al. | 705/500 |
| 7,831,928 B1* | 11/2010 | Rose et al. | 715/810 |
| 8,620,872 B1* | 12/2013 | Killalea | 707/687 |
| 2007/0132780 A1 | 6/2007 | Garbow et al. | 345/619 |
| 2007/0136745 A1 | 6/2007 | Garbow et al. | 725/34 |
| 2007/0214121 A1* | 9/2007 | Ebanks | 707/3 |
| 2008/0002892 A1* | 1/2008 | Jelonek et al. | 382/224 |
| 2008/0255977 A1* | 10/2008 | Altberg et al. | 705/35 |
| 2009/0087161 A1* | 4/2009 | Roberts et al. | 386/66 |
| 2009/0132271 A1* | 5/2009 | Typaldos | 705/1 |
| 2009/0319288 A1* | 12/2009 | Slaney et al. | 705/1 |
| 2010/0042928 A1* | 2/2010 | Rinearson | 715/737 |
| 2010/0042932 A1 | 2/2010 | Lehtiniemi et al. | 715/747 |
| 2012/0110073 A1* | 5/2012 | Chakra et al. | 709/204 |
| 2012/0150972 A1* | 6/2012 | Morris et al. | 709/206 |
| 2012/0158753 A1* | 6/2012 | He et al. | 707/752 |
| 2012/0320013 A1* | 12/2012 | Perez et al. | 345/207 |

(Continued)

FOREIGN PATENT DOCUMENTS

| WO | WO-2007/035558 A2 | 3/2007 |
|---|---|---|
| WO | WO-2009/145826 A2 | 12/2009 |
| WO | WO-2012/056092 A1 | 5/2012 |

OTHER PUBLICATIONS

Marcus, Aaron and Angel Perez, "M-YouTube mobile UI: Video selection based on social influence", Lecture Notes in Computer Science (including subseries Lecture Notes in Artificial Intelligence and Lecture Notes in Bioinformatics), v 4552 LNCS, n Part 3, Human-Computer Interaction: HCI Intelligent Multimodal Interaction Environments--1.*

(Continued)

*Primary Examiner* — Richard Bowen
(74) *Attorney, Agent, or Firm* — Harrington & Smith

(57) ABSTRACT

Systems and techniques for selecting content elements for multimedia. Information relating to contributors to content elements, such as association with previous content elements, roles in relation to content elements, ratings, interest, social friends, and the like, is stored and analyzed as needed to assist in selection of content elements for direct use or for assembly into a compilation. In situations in which a contributor declines to allow use of his or her content or likeness, substitute content may be selected based at least in part on an analysis of information relating to the declining contributor as it relates to a potential replacement contributor. For example, a replacement may be based on similarity of a replacement contributor to a declining contributor.

42 Claims, 7 Drawing Sheets

(56) References Cited

U.S. PATENT DOCUMENTS

| | | | |
|---|---|---|---|
| 2013/0136316 A1 | 5/2013 | Grassel et al. | 382/115 |
| 2013/0138693 A1 | 5/2013 | Sathish et al. | 707/784 |
| 2013/0141529 A1 | 6/2013 | Sathish | 348/43 |

OTHER PUBLICATIONS

Cricri, F. et al.; "Multimodal Event Detection in User Generated Videos"; IEEE International Symposium on Multimedia; 2011; pp. 263-270; IEEE Computer Society.

Cricri, F. et al.; "Sensor-Based Analysis of User Generated Video for Multi-camera Video Remixing"; MMM 2012, LNCS 7131; 2012; pp. 255-265; Springer-Verlag Berlin Heidelberg.

Lee, Jae-Ho; "Automatic Video Management System Using Face Recognition and MPEG-7 Visual Descriptors"; ETRI Journal, vol. 27, No. 6; Dec. 2005; pp. 806-809.

Verstockt, S. et al.; "Actor Recognition for Interactive Querying and Automatic Annotation in Digital Video"; Internet and Multimedia Systems and Applications; Aug. 17-19, 2009; Honolulu, Hawaii, USA; pp. 149-155.

* cited by examiner

Define users to be featured

Select role(s):
[X]Actor [X]Cameraman [ ]Commentator more....

| | | |
|---|---|---|
|  | Alan Smith | X |
|  | Ellen Smith | |
|  | John Smith | X |
|  | Kim Smith | X |
| more... | | |

Search for a user: _____

400

METHODS AND APPARATUS FOR MULTIMEDIA CREATION

TECHNICAL FIELD

The present invention relates generally to creation of multimedia content. More particularly, the invention relates to automated assembly of multimedia content, with content elements being selected based at least in part on criteria compiled across one or more social networks for one or more characteristics of the content elements.

BACKGROUND

Modern electronic devices give individual users the ability to create multimedia content that could previously be created only with large assemblies of expensive equipment, operated by numerous people. In addition, modern devices give users the ability to share content with one another. Whenever an event is attended by large numbers of people, inevitably many of these people will record the event, and different persons may record different portions of the event. The recordings made by different persons provide material which can theoretically be edited together to form more complete or personally relevant recordings. In addition, different multimedia material elements, which may be recorded or otherwise created by different persons at different times, could, theoretically, be assembled to form interesting and enjoyable presentations. The great mass of such material presents considerable opportunities for creative expression and for collaboration, but the amount of material available, and the number of persons creating material, renders collaboration difficult.

Currently available mechanisms for assembly of multimedia material allow for a user to create material and upload the created material to a service, and for a work to be automatically assembled from elements submitted by different users, based on analysis of the content itself and information provided in relation to the material. However, a great deal of duplication of material is inevitable because creative tools are so widely available. Especially in the case of an amateur work, the subject is likely to be widely featured in works created by others, so that identifying the subject may yield little information distinguishing the work from others featuring the same subject. Identifying the individual appearing in a work may also do little to distinguish the work, because so many works feature similar people doing similar things. In addition, the similarity of so many works renders it difficult to select works that will combine with others in a particularly appealing way.

Furthermore, important issues of privacy and consent surround creative works, particularly audiovisual works. Persons may not wish to appear in someone's creative work, or may place conditions on their appearance. Such conditions may be unacceptable especially to an amateur creator. In the case of a person who does not wish to appear in a work, it may be desirable to use a substitute, and would be desirable to have some mechanism for selecting the substitute.

SUMMARY

According to one embodiment of the invention, an apparatus comprises at least one processor and memory storing computer program code. The computer program code is configured to, with the memory and the at least one processor, cause the apparatus to at least identify a contributor to at least one multimedia content element, identify a role of the contributor with respect to the at least one content element, store information relating to the contributor of the content element, and store information relating to the at least one content element for use in automated selection of the content element, wherein the information relating to the at least one content element comprises at least information relating to the contributor and the role of the contributor with respect to the at least one content element.

In another embodiment of the invention, a method comprises configuring at least one processor to cause an apparatus to at least identify a contributor to at least one multimedia content element, identify a role of the contributor with respect to the at least one content element, store information relating to the contributor of the at least one content element, and store information relating to the at least one content element for use in automated selection of the content element, wherein the information relating to the at least one content element comprises at least information relating to the contributor and the role of the contributor with respect to the at least one content element.

In another embodiment of the invention, a computer readable medium stores a program of instructions. Execution of the program of instructions by a processor configures an apparatus to at least identify a contributor to at least one multimedia content element, identify a role of the contributor with respect to the at least one content element, store information relating to the contributor of the at least one content element, and store information relating to the at least one content element for use in automated selection of the at least one content element, wherein the information relating to the content element comprises at least information relating to the contributor and the role of the contributor with respect to the at least one content element.

DETAILED DESCRIPTION

Embodiments of the present invention recognize that information sharing between users of communication networks provides a useful source of information that can be used to evaluate and select content created by or featuring users. In addition, the invention recognizes that analysis of content, together with the use of stored information identifying contributors of content, can be used to credit contributors to particular works, and can also be used to identify their roles in creating the works, such as appearing in the work, camera operation, direction, sound, or editing. Identifying contributors to a work can allow viewers to rate the contributions, and such information provided by such ratings can serve to distinguish contributors to works from one another and, therefore, serve to distinguish works created by such contributors from one another. If a contributor gains a reputation for producing works with desirable features, the association of the contributor to the work motivates the selection of the work for use, such as viewing, or for inclusion in assembled works.

In addition, other characteristics of users, such as popularity or interests, can be used in selecting works for various purposes. For example, content featuring birds may, if created by a contributor having a strong interest in birdwatching, be preferred over content created by an average contributor.

In addition, one or more embodiments of the invention recognize that ratings and other information relating to contributors to content may be used to select substitute content if a contributor does not wish to be featured in a work. For example, a person at an event may not wish to appear in a work, or a contributor to a work may not wish to have his or her work used as part of an assembled work. Embodiments of the present invention may therefore be used to identify similar content similar to that featuring a contributor who does not wish his or her contribution to be used. Information such as the contributor's interests, popularity, friends, and other relevant information may be used to determine similarities between the contributor who has declined permission and a substitute contributor. Analysis of the content, such as time information, scene analysis to identify the scene being depicted, analysis to identify similar field of view and camera angles, and other analysis, may be used to insure that the overall scene is similar to the scene for which a substitution is being made.

Figure 1:
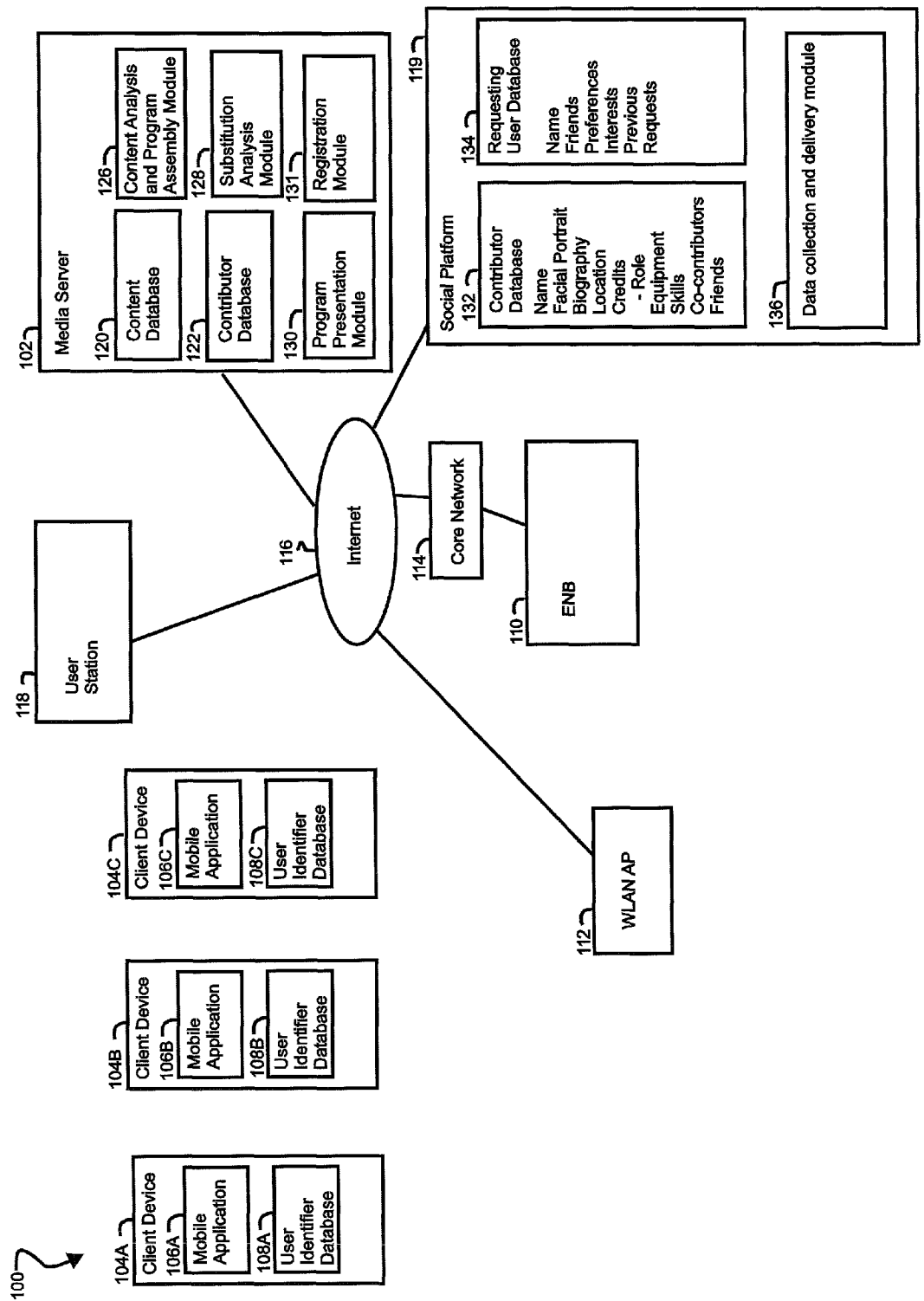
FIG. 1 illustrates a system according to an embodiment of the present invention.

FIG. 1 illustrates a system 100 according to an embodiment of the present invention. The system 100 comprises a media server 102 receiving media information from client devices 104A, 104B, and 104C, used to record and upload content such as audiovisual material. The client devices 104A, 104B, and 104C may be any of a number of devices providing recording and communication capabilities, and may suitably provide wireless communication capabilities, such as wireless networking or cellular networking capabilities, or any combination thereof. Mobile applications 106A-106C, may reside on the client devices 104A-104C, respectively, logging information relevant to classifying the content and identifying and classifying contributors. For example, the mobile application 106 may have access to a user identifier database 108 that stores information specific for identifying users of the device 104. For example, typically only one person or a few people have access to any single personal communication device, and various device applications may require login. In one convenient mechanism for identifying contributors to content, the mobile applications 106A-106C may conveniently require login, and the user identifier databases 108A-108C may store login information for each user together with identification. The client devices 104A-104C and similar client devices may suitably be any devices that can carry on communication and may, for example, comprise cellular network devices communicating with a base station such as an eNodeB (eNB) 110 operating in a cellular network such as a third generation preferred partnership long term evolution (3GPP LTE) network, or a wireless local area network (WLAN) access point (AP) 112. The eNB 110 may communicate with a core network 114, with the core network providing access to the public Internet 116 for the eNB. The media server 102 may also be accessible to user stations such as the user station 118, through the Internet 116. The system 100 may also comprise a social platform 119, allowing registered users to share information that may be used by the media server 102, user devices 104A-104C, user station 118, and other suitable devices to associate contributors with creative works, to identify attributes of contributors and works, such as ratings of contributors and works, themes of works, interests and roles of contributors, appearance of contributors who appear in works, in order to allow for identification of those contributors as they appear in the works, and other relevant information. The media server 102 uses content uploaded from devices such as the devices 104A-104C and information retrieved from the social platform to identify content elements for assembly into a compiled work. The compiled work may be an assembly of a plurality of content elements or may be a single content element. Different content elements may be of different types, and may be identified as belonging to one or more of these types through, for example, analysis when a compiled work is being assembled, explicit identification at the time the content elements are created or thereafter, or other suitable mechanisms. A content element may, for example, be designated as belonging to type comprising video elements or audio elements, or may be designated as belonging to a type comprising close-up still images, close-up moving images, nature images, landscape images, or the like. One or more content elements may be specially ordered from a selected contributor, and information available through the social platform 119 to identify a contributor likely to have the needed abilities and equipment, and to communicate with that contributor.

The media server may comprise a content database 120 and a contributor database 122, including content and contributor information such as credits and tags in the case of content information and interests, works created, roles, ratings, and similar information in the case of contributors. The media server 102 may also employ a content analysis program assembly module 126 for selecting and compiling programs, compilations, or remixes of media, and a substitution analysis module 128, for selecting a substitute content element to replace one featuring a contributor who declines to allow his likeness or other contribution to be used. The media server 102 may further employ a program presentation module 130 for presenting programs to a user, such as by delivering the program to a user device such as the devices 104A-104C or a user station such as the user station 118. The program presentation module 130 may present an interface, such as a window alongside or beneath a program window, identifying contributors associated with the element currently being presented, or, in the case of contributors appearing in the work, the contributor currently appearing.

The media server 102 may further employ a registration module 131, allowing a user to enter information relating to his or her roles as a contributor to a content item or as a user or requester of a content item. For example, the registration module 131 may allow a user to enter information such as his or her name and contact information, to designate whether the user's actual name is to be made available and to whom, and to specify a pseudonym by which the user is to be identified with content items. The registration module 131 may further allow the user to specify associations between the user and content items, such as a user's personal appearance in a content item, or the user's work on directing, sound editing, video editing, choreography, or the like. The registration module 131 may further allow a user to perform an initial upload of content items with which the user is associated. The registration module 131 may direct storage of the user and content information in the content database 120 and the contributor database 122 as needed.

The social platform 119 may comprise a contributor database 132, including information such as a contributor name, which may be a screen name, facial portrait, identifying features for facial recognition, biography, location, credits for works that have already been created, including the contributor's role in such works, equipment available to the contributor, co-contributors, and social networking friends. The social platform 119 may also comprise a requesting user database 134, which may include information such as name, friends, preferences, interests, previous requests, and other information that may be used in analyzing content elements to identify those that may be appealing to or desired by the requesting user. The social platform 119 may also comprise a data collection and delivery module 136, allowing for receiving and updating of information, such as through social networking interfaces presented to the user devices 104A-104C or the user station 118.

Figure 2:
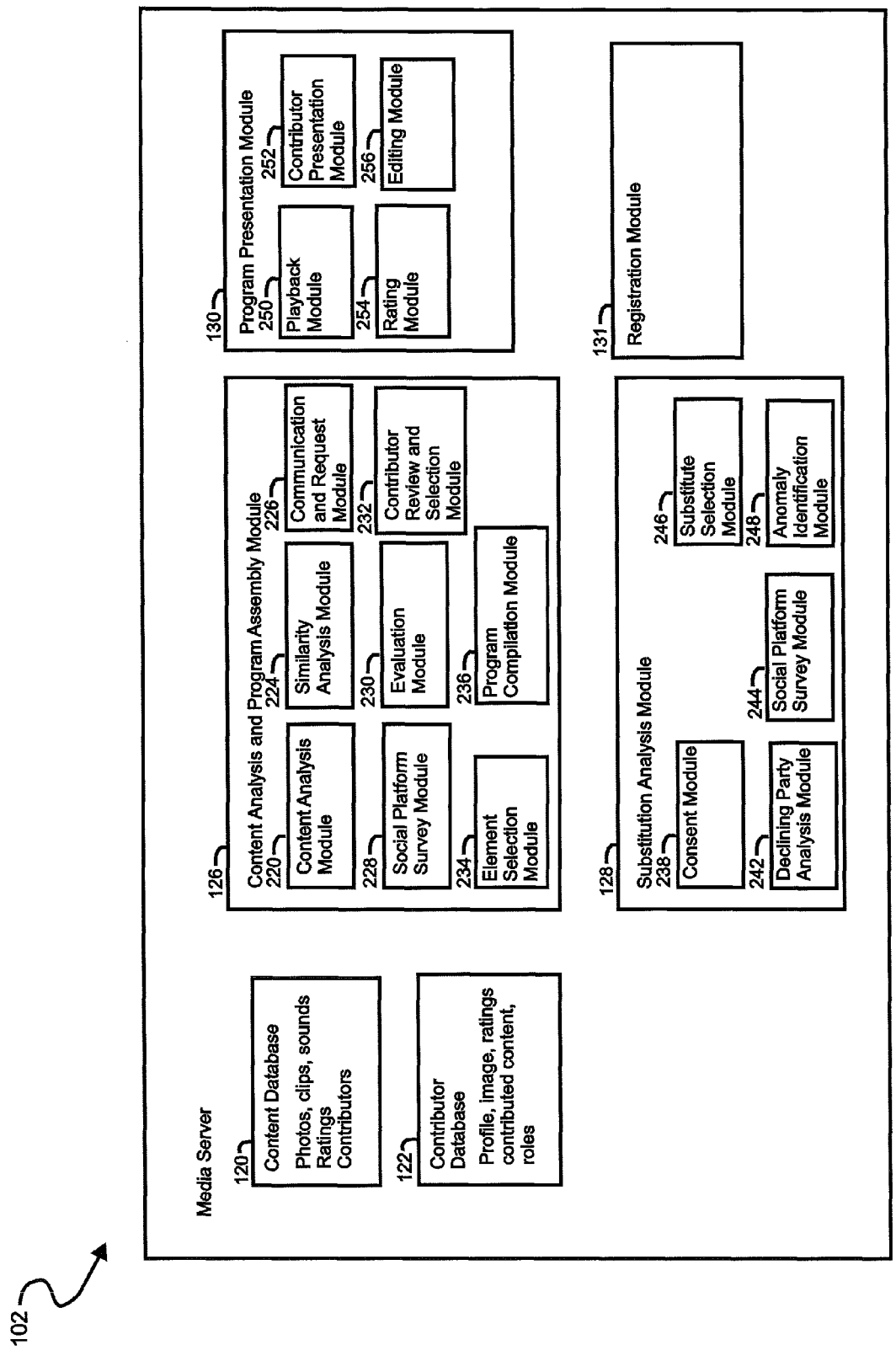
FIGS. 2 and 3 illustrate additional details of selected elements of the system of FIG. 1.

FIG. 2 illustrates additional details of the media server 102, showing the content database 120 and the contributor database 122, as well as additional details of the content analysis and program assembly module 126, the substitution analysis module 128, and the program presentation module 130. The content analysis and program assembly module 126 comprises a content analysis module 220, similarity analysis module 224, communication and request module 226, social platform survey module 228, evaluation module 230, and contributor review module 232. The content analysis module 220 examines content elements and associated data to determine subject, venue, persons appearing in the content element, and other characteristics. The similarity analysis module 224 examines content elements with respect to other content elements being considered for assembly into a work. For example, content elements depicting the same event or featuring the same persons may be favored for use with one another. The communication and request module 226 manages communication between a requesting user and a proposed contributor. A contributor having skills and associations desired by a particular user, such as ratings, interests, or shared friends, may be automatically identified using social platform data, and information may be presented to a requesting user, who may then contact the identified contributor to request the contributor's creative services. Alternatively or in addition, the communication and request module may receive parameters defining a work to be assembled and automatically generate one or more requests to users who are identified as capable of producing worthwhile content elements.

The social platform survey module 228 examines information stored in the social platform 119 to obtain information useful in evaluating and selecting works and contributors to works. For example, the content analysis module 220 may identify contributors to assembled works and to content elements and the social platform survey module 228 may then examine the social platform 119 to obtain relevant information for the works and content elements and for their contributors. For example, relevant information for a contributor appearing in a work may be whether the contributor is a friend of an interested user or has shared friends of the interested user. Other relevant information for a contributor may be ratings of the contributor, ratings of works to which the user has contributed, similarity of works created by the contributor to those highly rated by an interested user, and so on. The social platform survey module collects relevant information and passes the information to an evaluation module 230, which uses information such as that obtained from analyzing a content element, and that obtained by the social platform survey module 228, to select contributors or content elements.

The content analysis and program assembly module 126 further employs a contributor review and selection module 232. The contributor review and selection module 232 allows a user to examine the social platform 119 for contributor information. The information may be retrieved, for example, by the social platform survey module 228 and be based on one or more of direct selections of an interested user or users or an automatic analysis based on factors such as characteristics of the interested user and his or her similarities to the contributor, or preferences and interests of the requested user and how well those preferences and interests are fulfilled by the contributor and by content elements associated with the contributor. The content analysis and program assembly module 126 further employs an element selection module 234 and a program compilation module 236. The element selection module 234 analyzes content elements and contributors and selects one or more content elements suitable for use by one or more interested users. The program compilation module 236 automatically edits selected content elements into a program, suitably based at least in part on parameters specified by users requesting the compilation or users who are likely to be part of a target audience for the assembled program.

One significant function that may be performed by the content analysis and program assembly module 126 is crediting of contributors. Such crediting may be performed more or less automatically, drawing information from the content analysis module 220, the social platform survey module 226, the contributor selection and review module 232, the content database 120, the contributor database 122, and other sources of information. Credit information may be stored with individual content elements and with compilations, and may be stored, for example, in the content database 120 along with the content items or compilations with which the credit information is associated.

For example, a requesting user may specify parameters for the creation of a compilation, and the content analysis and program assembly module 126 may invoke appropriate ones of its included modules to select and assemble content items into a compilation. With each user being able to specify different parameters, compilations requested by different users will have different content. For example, a user may specify parameters, or parameters may be chosen by default, so as to favor including the user's friends in the compilation. A user requesting a compilation might be credited as director. The content analysis module 220 might identify contributors appearing in a content item, or persons appearing in a content item might be specifically identified. These contributors might be credited as actors. Other contributors, such as camera operators and editors, might be identified either explicitly by a requesting user, or automatically, for example, through tags associated with the content items or by means of automatic face recognition operating on the content items. A list of credits for a content item or a compilation may be assembled and associated with the content item or compilation. When a compilation is assembled from a plurality of content items, credit information specifying each contributor's role in each content item may be assembled and associated with the compilation. At a suitable point in presentation of a compilation credits may, for example, be presented for each contributor, and the contributor's role with respect to each element of the compilation may be presented.

A contributor's specific role may be based at least in part on information taken from the social platform 119. For example, the contributor database 132 may include information identifying friends or ratings of a contributor, and the rating or popularity of a contributor may be used in determining the role assigned to the contributor in the list of credits.

For example, a high rated user or a popular user may be credited as the "star" in one or more content items, and such crediting may lead the contributor review and selection module 232 to favor selecting the user in creating a compilation. Alternatively or in addition, a contributor with many common friends of a requesting user may be credited as the "star".

Once a list of credits has been assembled for a content item or compilation, the list of credits may be associated with the content item or compilation and stored in the content database

120. The list of credits may be available for examination at any time, and may also be presented as part of the content item or compilation.

Rating information, which may suitably be taken from the social platform, may also be used to estimate the relative desirability of a content items associated with a user and to determine whether they should be selected for use, for example, in a compilation. To take one example, a contributor may have an associated high rating for producing a particular type of work. For example, a contributor may have a high rating for producing close-up video shots, so that close-up video shots by the contributor will tend to be favored. To take another example, a contributor may have a high rating with respect to a particular attribute, such as sharpness of images, and the high rating would influence selection mechanisms, such as the element selection module 234 and the program compilation module 236 to favor images created by the contributor having such a rating when the content item or compilation should include sharp images.

One or more embodiments of the invention provide for automated mechanisms for generating, for example, a video remix. For example, a video remix may be automatically compiled from source videos captured by several users while attending a musical event such as a concert. In one or more embodiments of the invention, the content analysis module 220 might time-align the source videos by means of audio track cross correlation. The program compilation module might create an automatic video remix by joining together excerpts of the source videos so that the most suitable source video, or video angle, is used at each point in time. Suitability may be determined, for example, based on a content element's type, such as audio, still images, close-ups, or the like.

To obtain professional looking automatic video remixes, the content analysis module 220 may, for example, perform beat and downbeat analysis on the sound track of the video to be created, and perform scene cuts at downbeats. Furthermore, the content analysis module may utilize information provided by sensor data or context data associated with the source videos to determine the most suitable source video to be shown at each time. For example, shaky videos, which may be indicated by large accelerometer signal values associated with a source video, may be excluded, and videos from users pointing at a common region of interest determined using location data and compass data may be preferred. When a user requests an automatic video cut, the content analysis and program assembly module 126 may perform an automatic video remixing process to create a remix for this user. The requesting user may be credited as the director. Selection may also suitably be performed based at least in part on information available from the social platform 119 or other social networking information. For example, the clips containing pictures of the user's friends as obtained from the social platform 119 may be preferred when selecting the source videos (video angles) to be included in the remix. To take another example, when the program compilation module, which may employ automated video editing logic, determines that a close up video angle is preferred, it may favor selecting the angle from a user who has obtained high ratings regarding close up videos he has provided to the service. The created list of credits may be included, for example, as text before after, or both before and after the video clip or compilation, attributing the users whose source videos were used in the remix as cameramen, one or more users who appear in the video remix as 'stars', and/or the user who requested the creation of the remix as the director. The video remix may then be made available for other users to view. While viewing, the users may rate the content. When a user gives a rating to a portion of the video while watching, the rating is associated to the currently viewed source video and the user who provided the source video. The rating information may be used when creating new automatic video remixes using this source video.

The media server 102 also, as previously noted, employs a substitution analysis module 128. Privacy is important to many users of media and information sharing services, and many creators of content wish to control the use of their content, either because they may wish to sell the content or because they simply fear compromise of their privacy and wish either to control information such as the use of their likeness. In any case, many users will prefer to create programs only with contributions by consenting contributors, to avoid possible legal liability or, at the least, hard feelings.

The substitution analysis module 128 may comprise a consent module 238, to identify a contributor to a content element, request consent, and determine whether or not consent was received. If consent is not received, the contributor is determined to be a declining party and the content element will not be used. The substitution analysis module 128 employs a declining party analysis module 242, which analyzes content elements for their similarity to the content element associated with the declining party. The analysis may take into account the nature of the content elements, such as the venue in which the content element was taken, such as a crowd shot at a concert, the general appearance of the persons in the content element, such as a crowd shot, the time of day and lighting, and other relevant information. In addition, the substitution analysis module 128 may have its own social platform survey module 244, which can examine the social platform 119 or other accessible social platforms for information relating to the contributor and to other contributors who have created similar content elements, in order to allow the selection to be made based at least in part on characteristics of the declining party. For example, if one scene depicts the declining party together with a number of his or her friends, and another similar scene depicts a number of the declining party's friends but not the declining party, and these friends are all willing to consent, the second scene may be seen as a close match to the first scene. The substitute selection module 246 may use analysis of the content element in question and the contributor in question and information relating to the similarity of other content elements to the content element in question and may select a substitute content element based on that analysis. The substitution analysis module 128 may also implement an anomaly identification module 248. For example, a substitution might, for example, cause a person in the substitute content element to appear to be displaced in space or time if the same person appears elsewhere in the assembled program. For example, the substitute element might be shot on a different day as the element being replaced, but at the same location, and on the previous day a person appearing in the substitute element might have been shot at a different location. Therefore, a compilation using both scenes in succession might appear to have the same person shift instantly from one place to another. The anomaly identification module 248 may examine content elements for such phenomena and, if a content element's inclusion would cause such a phenomenon, reject the content element or notify a user that phenomenon will occur, allowing the user to choose to accept or reject inclusion of the content element.

The substitution analysis module 128 may use any number of visual recognition techniques for identifying the person from whom consent is to be obtained or who is to be replaced if consent has not been obtained or of an explicit rejection, whether for a specific content element or for categories of content elements, such as those being created by someone whom the person does not know. In the case of someone appearing in a visual work, any number of visual recognition techniques may be used, such as face recognition for photographs and frames of video, voice recognition, or other techniques. Substantial explicit identification information may also be available. For example, content elements may be tagged with information indicating their contributors and wireless identifiers may be associated with users the identified wireless devices. Such information may be useful in narrowing the set of persons against whom comparisons are to be made, and in cases in which a person does not appear in the work, the wireless identifier may be useful in identifying the person filling another role, such as camera operator. Typically, only one or a few persons have access to any individual wireless device, and in the typical case the owner of the device may be expected to fill roles involving operation of the device, such as camera operator.

Criteria for selecting a substitute may include visual characteristics such as clothing, height, situation, such as place and time, and similar information. As noted above, social platform information may also be used to determine similarity.

To take an example of the use of social platform information, the similarity of persons may be judged in terms of their popularity. For example, popularity of a person may be based on the number of his or her friends, or the number of positive ratings by friends. Two persons who are judged as more or less equally popular may be determined to be more similar than two persons, one of whom is popular and one of whom is less popular. Another element of social network information that can be taken from social networks may relate to hobbies or interests: two or more persons having the same hobby may be determined to be more similar than persons with different hobbies.

In one or more embodiments of the invention, replacement may be performed only for the face portion in a visual media item. In a video clip, the face may be identified in the first or the first few frames, and the identified face may be tracked through frames in which it appears and replaced in all such frames.

The program presentation module 130 may comprise a playback module 250, contributor presentation module 252, and rating module 254. The playback module 250 presents a content element such as an audiovisual content element and the contributor presentation module 252 may present a list of contributors, and a playback window may indicate where in the content element each contributor appears. The program presentation module 250 may also present an editing module 256, which may present a complete timeline of a content element or an assembled program, with the ability to scroll backward and forward through the content element or program.

It is noted that although the module 250 is referred as playback module, the module may offer the media stream in other ways than playback. For example, the module way provide the media for streaming or progressive download or otherwise make the content available for viewing by users.

Figure 3:
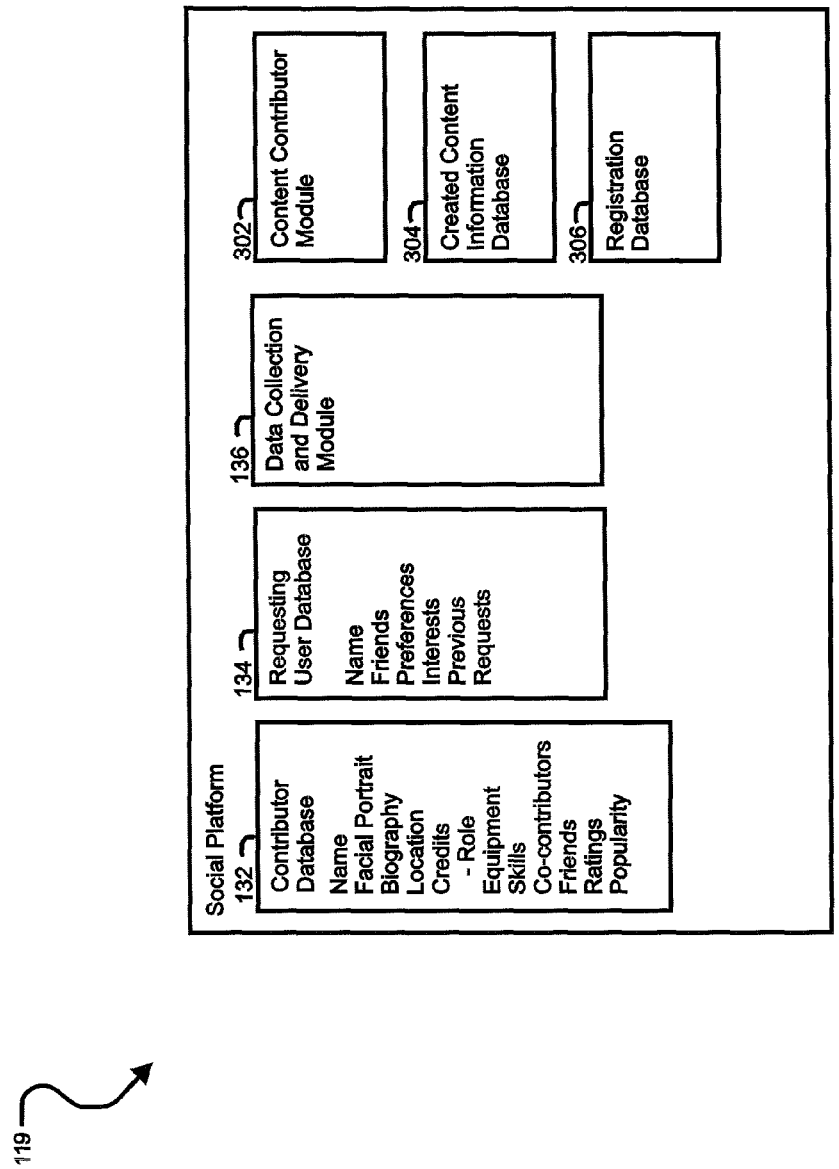

FIG. 3 illustrates additional details of the social platform 119. In addition to the contributor database 132, the requesting user database 134, and the data collection and delivery module 136, the social platform 119 may include elements directed to crediting contributors and tagging content elements with contributor information, and also with receiving information such as evaluation information. The social platform 119 therefore employs a content contributor module 302, which presents an interface to a creator of a content element, such as through a mobile application such as the mobile applications 106A-106C. The interface may, for example, present the identification of the user of the mobile device with a list of roles, allowing the user to indicate that he or she has filled one or more of the listed roles, such as camera operator, director, actor, or the like. The interface may, alternatively or in addition, provide mechanisms to allow for entry of an identifier, such as a person's name or social platform identifier, along with the designation of the role. Credit information for each contributor may be stored in the contributor database 132, and may also be stored in a created content information database 304, storing credit information in association with each content element.

The social platform 119 may also include a registration module 306, allowing new users to register, identifying content they have created and roles they have filled. Registration causes creation of an entry in the contributor database. The registration module 306 may also provide for updating of the contributor database 132.

Figure 4:
FIGS. 4 and 5 illustrate user interfaces according to embodiments of the present invention.
Figure 4:
Figure 4:
Figure 4:

FIG. 4 illustrates an exemplary interface screen 400 according to an embodiment of the present invention. The screen 400 may suitably be presented by the contributor review and selection module 232, and identifies contributors of interest to a user. Content elements associated with the designated contributors may be searched for or contributors may be selected for invitation to contribute to a planned or desired content element. The interface screen 400 provides mechanisms for searching for contributors, and search queries may include parameters such as user names, stage names or pseudonyms, ratings, similarity to other contributors, content elements to which contributions have been made, and so on.

Figure 5:
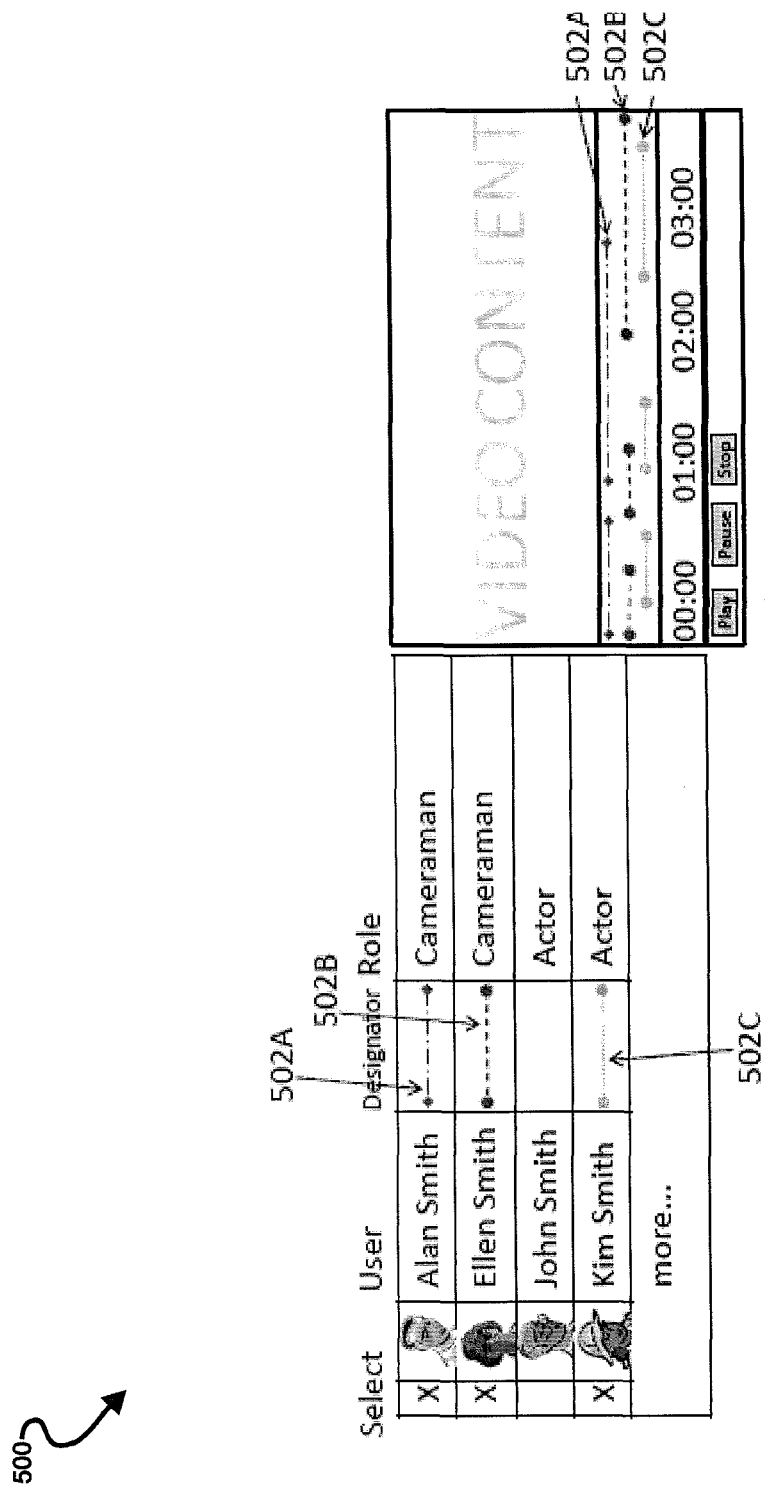

FIG. 5 illustrates a media player window 500 that may be presented, for example, by the playback module 250 or the editing module 256. The window 500 presents identifying information for the contributors of a content element, which in the present exemplary case, is a video presentation. The window 500 further presents appearance designators 502A-502C indicating contributors associated with the particular content item in question, and these designators appear in a timeline presented in the window 500. Through the designators 502A-502C, a user may quickly access a segment in the media that features the contribution of one or more users.

Figure 6:
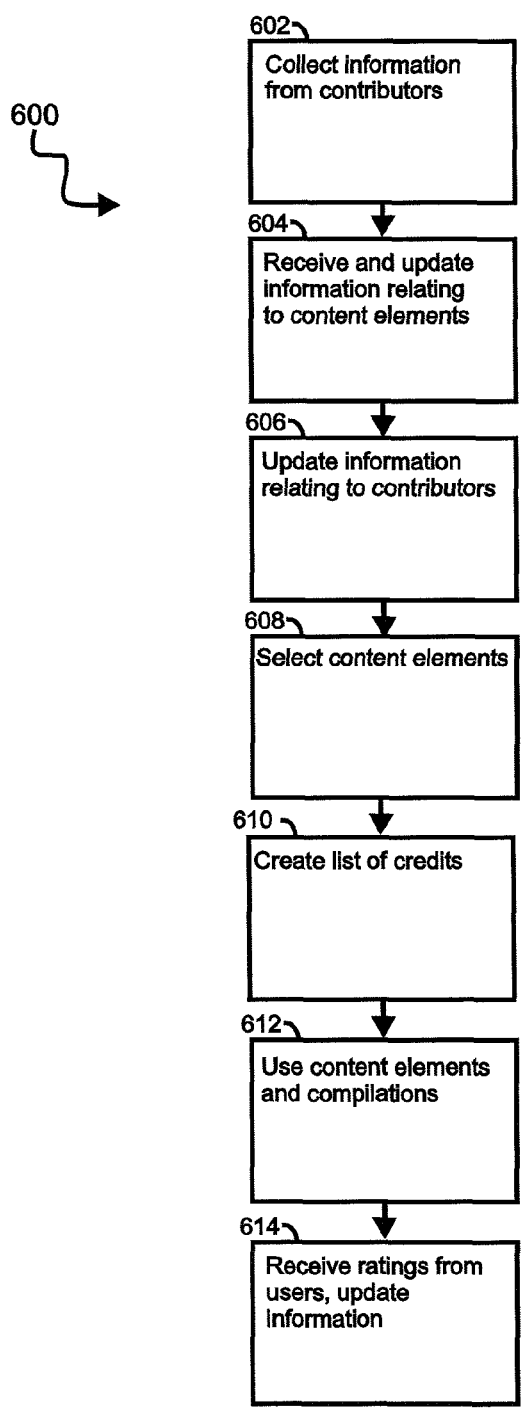
FIG. 6 illustrates a process according to an embodiment of the present invention.

FIG. 6 illustrates a process 600 according to an embodiment of the present invention. At step 602, information is collected from a plurality of persons, suitably referred to as contributors, who have or may create content elements such as multimedia presentations. The information comprises identification of the persons and information relating to their associations with content elements. At step 604, information relating to content elements is received and updated. Updating may occur, for example, continuously as new information is received from persons using the content elements. The information may, for example, include identification of content elements and various information elements relating to media items submitted as content elements are created, such as tags identifying contributors. Tags and other information may also include information relating to features of content elements, such as location, time, and other information. Additional information that may be updated includes ratings of content elements as they are viewed and evaluated by users. At step 606, information relating to contributors is updated. Updating may suitably occur on any desired schedule, such as continuously, as the information is received. Updating may include, for example, the creation of new associations between contributors and new content elements, and may include updates of ratings of contributors in various roles of content elements. At step 608, content elements are selected for use or for assembly into larger programs based at least in part on information relating to the content elements and on the contributors to the content elements. Information used for selection may include, for example, information relating to relationships and between contributors and content elements, between contributors, and between users and contributors, and evaluations of contributors, content elements, or both. For example, a contributor may have a high average rating as a creator of close-up shots, and the existence of such a rating for the contributor may lead to favoring close-up shots by the contributor when a selection is to be made. To take another example, selection may be based at least in part on a history of association between a contributor and content treating a particular subject, on shared interests between a contributor and a user for whom content is being selected, on shared friends of contributors and users, on ratings of contributors, and the like. Selection may further comprise automated remixing, wherein one or more content items are selected based on specified criteria, such as suitability for use in a compilation relating to, for an example, an event. The content items may be analyzed to determine appropriate points at which they are to be combined, such as through analysis of their audio characteristics.

Selection may also include identification of whether a contributor has consented to the use of his likeness or other contributed content, and the identification and selection of suitable replacement content. Selection of replacement content may be based at least in part on similarities between the original contributor and contributors associated with replacement content. At step 610, a list of credits is created, identifying contributors to a content item or compilation. The specific roles ascribed to contributors may be based at least in part on factors such as ratings, popularity, relationships, and other information relating to their relationships with other users and contributors. For example, such a list of credits may be included in the beginning and/or the end of an automatically created video remix of a musical event.

At step 612, content elements and compilations of content elements are viewed, listened to, or otherwise used. At step 614, during use of a content element, a user may enter a rating, such as a rating of a content item, compilation, or contributor, and information relating to the item being rated may be updated.

Figure 7:
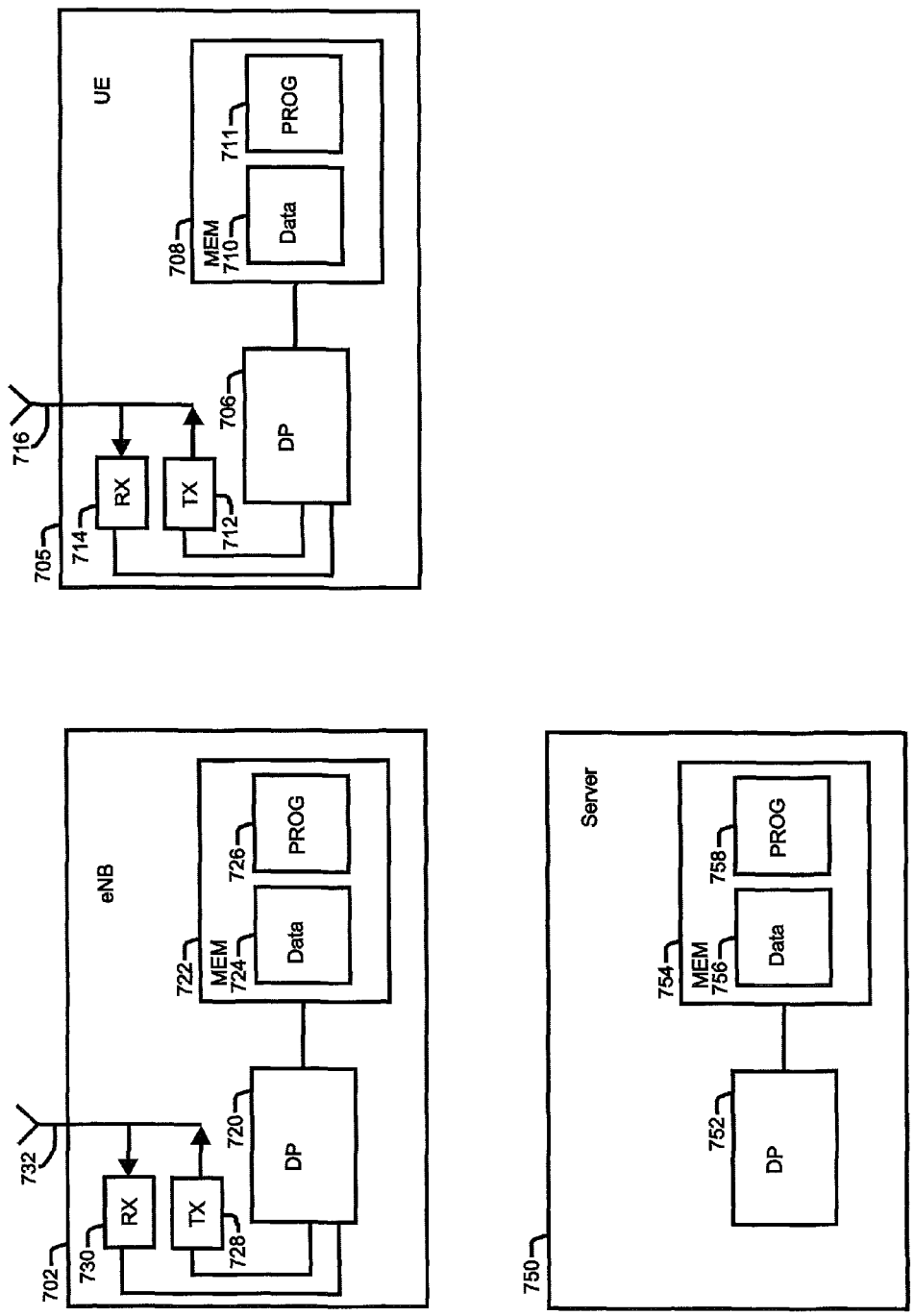
FIG. 7 illustrates elements for carrying out one or more embodiments of the present invention.

Reference is now made to FIG. 7 for illustrating a simplified block diagram of various electronic devices and apparatus that are suitable for use in practicing the exemplary embodiments of this invention. In FIG. 7 an eNB 702 is adapted for communication over a wireless link 704 with an apparatus, such as a mobile device/terminal such as a UE 705. While there are typically several UEs under control of an eNB such as the eNB 702, for simplicity only one UE 705 is shown at FIG. 7. The UE 704 may be a user device similar to the devices 104A-104C of FIG. 1, and a UE and eNB are illustrated here because one convenient mechanism for carrying out embodiments of the present invention involves communication using a cellular communication network. The eNB 702 may be any access node (including frequency selective repeaters) of any wireless network such as LTE, LTE-A, GSM, GERAN, WCDMA, and the like.

The UE 705 includes processing means such as at least one data processor (DP) 706, storing means such as at least one computer-readable memory (MEM) 708 storing data 710, at least one computer program (PROG) 711 or other set of executable instructions, communicating means such as a transmitter TX 712 and a receiver RX 714 for bidirectional wireless communications with the eNB 702 via one or more antennas 716.

The eNB 702 also includes processing means such as at least one data processor (DP) 720, storing means such as at least one computer-readable memory (MEM) 722 storing data 724 and at least one computer program (PROG) 726 or other set of executable instructions. The eNB 702 may also include and communicating means such as a transmitter TX 728 and a receiver RX 730 for bidirectional wireless communications with the UE 705 (or UEs) via one or more antennas 732.

FIG. 7 also illustrates one or more data processing elements such as a server 750, one or more of which may be employed as a media server such as the media server 102 or the social platform 119. The server 750 may include processing means such as at least one data processor (DP) 752, storing means such as a computer readable memory (MEM) 754, data 756, and at least one computer program (PROG) 758, or other set of executable instructions.

At least one of the PROGs 712 in the eNB 702 is assumed to include a set of program instructions that, when executed by the associated DP 720, enable the device to operate in accordance with the exemplary embodiments of this invention, as detailed above. The UE 705 also stores software 726 in its MEM 708 to implement certain aspects of these teachings. The server 750 also stores the software 758 in its MEM to implement these teachings. In these regards the exemplary embodiments of this invention may be implemented at least in part by computer software stored on the MEM 708, 722, and 754, which is executable by the DP 706 of the UE 705 and/or by the DP 720 of the eNB 705, and/or by the DP 752 of the server 750, or by hardware, or by a combination of tangibly stored software and hardware (and tangibly stored firmware). Electronic devices implementing these aspects of the invention need not be the entire devices as depicted at FIG. 3 or may be one or more components of same such as the above described tangibly stored software, hardware, firmware and DP, or a system on a chip SOC or an application specific integrated circuit ASIC.

In general, the various embodiments of the UE 705 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEMs 708, 722, and 754, include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 706, 720, and 752 include but are not limited to general purpose computers, special purpose computers, microprocessors, digital signal processors (DSPs) and multi-core processors.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. An apparatus comprising:
   at least one processor;
   memory storing computer program code;
   wherein the computer program code is configured to, with the memory and the at least one processor, cause the apparatus to at least:
   in response to a request by a user of a media storage and compilation system, identify a contributor to at least one multimedia content element;
   identify a role of the contributor with respect to the at least one content element;
   store information relating to the contributor of the at least one content element;
   store information relating to the at least one content element for use in automated selection of the content element, wherein the information relating to the content element comprises at least information relating to the contributor and the role of the contributor with respect to the content element, wherein the stored information comprises social platform information associated with the at least one content element, wherein the social platform information identifies at least one social networking relationship between a contributor to the at least one content element and at least one specified user of a social platform, other than the contributor and other than the requesting user of the media storage and compilation system, and wherein the social platform information identifying the at least one social networking relationship includes information specifically identified as relevant to the selection of a content element; and
   analyze stored information relating to the contributor to determine if the contributor has declined to allow use of at least one content element and to select a replacement content element based at least in part on analyzing the stored information associated with the declining contributor to identify a replacement contributor exhibiting similar characteristics to the declining contributor, wherein the similar characteristics comprise similarity in appearance between the replacement contributor and the declining contributor.

2. The apparatus of claim 1, wherein the stored information relating to the contributor of the at least one content element comprises evaluation information provided by users of the at least one content element with which the contributor is associated.

3. The apparatus of claim 1, wherein the stored information relating to the contributor of the at least one content element comprises information relating to at least one additional content element to which the contributor of the at least one content element has contributed.

4. The apparatus of claim 1, wherein the stored information relating to the contributor of the at least one content element comprises information identifying social platform friends of the contributor.

5. The apparatus of claim 1, wherein the computer program code is further configured to cause the apparatus to analyze stored information relating to the contributor to determine at least one similarity between the contributor and at least one potential user of the at least one content element.

6. The apparatus of claim 1, wherein the computer program code is further configured to cause the apparatus to analyze stored information relating to the contributor to determine whether content associated with the contributor is likely to meet one or more preferences of at least one potential user of content associated with the contributor.

7. The apparatus of claim 1, wherein the similar characteristics comprise shared friends between the replacement contributor and the declining contributor.

8. The apparatus of claim 1, wherein the similar characteristics comprise similarity of interests between the replacement contributor and the declining contributor.

9. The apparatus of claim 1, wherein selecting the at least one content element is based at least in part on social platform information associated with the content element.

10. The apparatus of claim 1, wherein the stored information comprises information identifying the at least one content element as belonging to a specified type of content element and wherein automated selection of the at least one content element is based at least in part on a type to which the content element belongs.

11. The apparatus of claim 1, wherein the at least one content element comprises a plurality of content elements, wherein selecting at least one content element comprises selecting a plurality of content elements, wherein the computer program code is further configured to cause the apparatus to analyze stored information relating to the plurality of content elements and to automatically join the content elements into a compilation based on the analysis of the stored information.

12. The apparatus of claim 11, wherein credit information relating to the contributor and the role of the contributor with respect to at least one of plurality of content elements is associated with the compilation.

13. The apparatus of claim 12, wherein the credit information comprises information relating to a role of the contributor with respect to the compilation as a whole.

14. The apparatus of claim 12, wherein the credit information comprises information relating to the role of the contributor with respect to at least one content element of the compilation.

15. A method comprising:
   configuring at least one processor to cause an apparatus to at least:
   in response to a request by a user of a media storage and compilation system, identify a contributor to at least one multimedia content element;
   identify a role of the contributor with respect to the at least one content element;
   store information relating to the contributor of the at least one content element;
   store information relating to the content element for use in automated selection of the at least one content element, wherein the information relating to the content element comprises at least information relating to the contributor and the role of the contributor with respect to the at least one content element, wherein the stored information comprises social platform information associated with the at least one content element, wherein the social platform information identifies at least one social networking relationship between a contributor to the at least one content element and at least one specified user of a social platform, other than the contributor and other than the requesting user of the media storage and compilation system, and wherein the social platform information identifying the at least one social networking relationship includes information specifically identified as relevant to the selection of a content element; and
   analyze stored information relating to the contributor to determine if the contributor has declined to allow use of at least one content element and to select a replacement content element based at least in part on analyzing the stored information associated with the declining contributor to identify a replacement contributor exhibiting similar characteristics to the declining contributor, wherein the similar characteristics comprise similarity in appearance between the replacement contributor and the declining contributor.

16. The method of claim 15, wherein the stored information relating to the contributor of the at least one content element comprises evaluation information provided by users of the at least one content element with which the contributor is associated.

17. The method of claim 15, wherein the stored information relating to the contributor of the at least one content element comprises information relating to at least one additional content element to which the contributor of the at least one content element has contributed.

18. The method of claim 15, wherein the stored information relating to the contributor of the at least one content element comprises information identifying social platform friends of the contributor.

19. The method of claim 15, further comprising configuring the at least one processor to cause the apparatus to analyze stored information relating to the contributor to determine at least one similarity between the contributor and at least one potential user of the at least one content element.

20. The method of claim 15, further comprising configuring the at least one processor to cause the apparatus to analyze stored information relating to the contributor to determine whether content associated with the contributor is likely to meet one or more preferences of at least one potential user of content associated with the contributor.

21. The method of claim 15, wherein the similar characteristics comprise shared friends between the replacement contributor and the declining contributor.

22. The method of claim 15, wherein the similar characteristics comprise similarity of interests between the replacement contributor and the declining contributor.

23. The method of claim 15, wherein selecting the at least one content element is based at least in part on social platform information associated with the content element.

24. The method of claim 15, wherein the stored information comprises information identifying the at least one content element as belonging to a specified type of content element and wherein automated selection of the at least one content element is based at least in part on a type to which the content element belongs.

25. The method of claim 15, wherein the at least one content element comprises a plurality of content elements, wherein selecting at least one content element comprises selecting a plurality of content elements, wherein the computer program code is further configured to cause the apparatus to analyze stored information relating to the plurality of content elements and to automatically join the content elements into a compilation based on the analysis of the stored information.

26. The method of claim 25, wherein credit information relating to the contributor and the role of the contributor with respect to at least one of plurality of content elements is associated with the compilation.

27. The method of claim 26, wherein the credit information comprises information relating to a role of the contributor with respect to the compilation as a whole.

28. The method of claim 26, wherein the credit information comprises information relating to the role of the contributor with respect to at least one content element of the compilation.

29. A non-transitory computer readable medium storing a program of instructions, execution of which by a processor configures an apparatus to at least:
  in response to a request by a user of a media storage and compilation system, identify a contributor to at least one multimedia content element;
  identify a role of the contributor with respect to the at least one content element;
  store information relating to the contributor of the at least one content element;
  store information relating to the content element for use in automated selection of the content element, wherein the information relating to the at least one content element comprises at least information relating to the contributor and the role of the contributor with respect to the at least one content element, wherein the stored information comprises social platform information associated with the at least one content element, wherein the social platform information identifies at least one social networking relationship between a contributor to the at least one content element and at least one specified user of a social platform, other than the contributor and other than the requesting user of the media storage and compilation system, and wherein the social platform information identifying the at least one social networking relationship includes information specifically identified as relevant to the selection of a content element; and
  analyze stored information relating to the contributor to determine if the contributor has declined to allow use of at least one content element and to select a replacement content element based at least in part on analyzing the stored information associated with the declining contributor to identify a replacement contributor exhibiting similar characteristics to the declining contributor, wherein the similar characteristics comprise similarity in appearance between the replacement contributor and the declining contributor.

30. The computer readable medium of claim 29, wherein the stored information relating to the contributor of the at least one content element comprises evaluation information provided by users of the at least one content element with which the contributor is associated.

31. The computer readable medium of claim 29, wherein the stored information relating to the contributor of the at least one content element comprises information relating to at least one additional content element to which the contributor of the at least one content element has contributed.

32. The computer readable medium of claim 29, wherein the stored information relating to the contributor of the at least one content element comprises information identifying social platform friends of the contributor.

33. The computer readable medium of claim 29, wherein execution of the computer program code further configures the apparatus to analyze stored information relating to the contributor to determine at least one similarity between the contributor and at least one potential user of the at least one content element.

34. The computer readable medium of claim 29, wherein execution of the computer program code further configures the apparatus to analyze stored information relating to the contributor to determine whether content associated with the contributor is likely to meet one or more preferences of at least one potential user of content associated with the contributor.

35. The computer readable medium of claim 29, wherein the similar characteristics comprise shared friends between the replacement contributor and the declining contributor.

36. The computer readable medium of claim 29, wherein the similar characteristics comprise similarity of interests between the replacement contributor and the declining contributor.

37. The computer readable medium of claim 29, wherein selecting the at least one content element is based at least in part on social platform information associated with the content element.

38. The computer readable medium of claim 29, wherein the stored information comprises information identifying the at least one content element as belonging to a specified type of content element and wherein automated selection of the at least one content element is based at least in part on a type to which the content element belongs.

39. The computer readable medium of claim 29, wherein the at least one content element comprises a plurality of content elements, wherein selecting at least one content element comprises selecting a plurality of content elements, wherein the computer program code is further configured to cause the apparatus to analyze stored information relating to the plurality of content elements and to automatically join the content elements into a compilation based on the analysis of the stored information.

40. The computer readable medium of claim 39, wherein credit information relating to the contributor and the role of the contributor with respect to at least one of plurality of content elements is associated with the compilation.

41. The computer readable medium of claim 40, wherein the credit information comprises information relating to a role of the contributor with respect to the compilation as a whole.

42. The computer readable medium of claim 40, wherein the credit information comprises information relating to the role of the contributor with respect to at least one content element of the compilation.

* * * * *